(12) United States Patent
Sayers et al.

(10) Patent No.: US 11,885,199 B2
(45) Date of Patent: Jan. 30, 2024

(54) ACTUATED SAND DUMP SYSTEM AND METHODS

(71) Applicant: SM ENERGY COMPANY, Denver, CO (US)

(72) Inventors: Sean Sayers, Fort Benton, MT (US); Nathan Gerber, Richmond, TX (US); Ryan Davis, Bixby, OK (US); Robert Balcer, Lakewood, CO (US)

(73) Assignee: SM ENERGY COMPANY, Denver, CO (US)

( * ) Notice: Subject to any disclaimer, the term of this patent is extended or adjusted under 35 U.S.C. 154(b) by 0 days.

(21) Appl. No.: 17/870,721

(22) Filed: Jul. 21, 2022

(65) Prior Publication Data
US 2023/0025302 A1    Jan. 26, 2023

Related U.S. Application Data

(60) Provisional application No. 63/203,521, filed on Jul. 26, 2021.

(51) Int. Cl.
*E21B 34/02*    (2006.01)
*E21B 43/34*    (2006.01)

(52) U.S. Cl.
CPC ............ *E21B 34/025* (2020.05); *E21B 43/35* (2020.05); *E21B 2200/04* (2020.05)

(58) Field of Classification Search
CPC ..... E21B 34/025; E21B 43/35; E21B 2200/04
See application file for complete search history.

(56) References Cited

U.S. PATENT DOCUMENTS

| | | | |
|---|---|---|---|
| 2,316,383 A | 4/1943 | Abercormbie | |
| 6,672,335 B1 | 1/2004 | Welborn | |
| 7,775,273 B2 | 8/2010 | Merlau et al. | |
| 10,221,645 B2* | 3/2019 | Elliott | E21B 43/013 |
| 10,570,712 B2* | 2/2020 | Mujica | E21B 43/128 |
| 10,577,911 B2 | 3/2020 | Morin et al. | |
| 11,154,796 B2* | 10/2021 | Hickie | B01D 21/34 |

(Continued)

FOREIGN PATENT DOCUMENTS

| | | |
|---|---|---|
| EP | 2999847 A1 | 3/2016 |
| WO | 2014/187596 A1 | 11/2014 |

(Continued)

OTHER PUBLICATIONS

"International Search Report and Written Opinion of the International Searching Authority," issued in connection with Int'l Appl. No. PCT/US2022/037929, dated Nov. 8, 2022 (13 pages).

*Primary Examiner* — Matthew R Buck
(74) *Attorney, Agent, or Firm* — Holland & Hart LLP

(57) ABSTRACT

An apparatus, system and related methods for controlling a pressurized flow from a high or low pressure system. An actuated sand dump system and related methods include a first valve positioned downstream of a high or low pressure system, a second valve positioned downstream of the first valve, a choke positioned between in the first and second valves, a plurality of pressure gauges, and a control unit operable to automatically open and close the first and second valves and the choke in a predetermined sequence, upon initiating the predetermined sequence, and in response to pressure measurements from the plurality of pressure gauges.

22 Claims, 10 Drawing Sheets

(56) References Cited

U.S. PATENT DOCUMENTS

| | | | | |
|---|---|---|---|---|
| 11,213,768 | B2* | 1/2022 | Pitcher | E21B 43/35 |
| 11,351,481 | B1* | 6/2022 | Pitcher | B01D 21/302 |
| 11,453,601 | B2* | 9/2022 | Johns | B01D 21/245 |
| 11,506,006 | B2* | 11/2022 | Lymberopoulos | E21B 34/08 |
| 2014/0345727 | A1* | 11/2014 | Gilmore | G05D 7/0635 |
| | | | | 137/624.21 |
| 2018/0156004 | A1* | 6/2018 | Hussain | E21B 43/0175 |
| 2019/0353017 | A1 | 11/2019 | Johns et al. | |
| 2020/0141221 | A1 | 5/2020 | Malone et al. | |
| 2021/0077923 | A1 | 3/2021 | Carlson et al. | |
| 2021/0205735 | A1 | 7/2021 | Coombe et al. | |
| 2021/0299594 | A1 | 9/2021 | Pitcher | |

FOREIGN PATENT DOCUMENTS

| | | |
|---|---|---|
| WO | 2019/200311 A1 | 10/2019 |
| WO | 2019/241326 A1 | 12/2019 |
| WO | 2020/102631 A1 | 5/2020 |

* cited by examiner

ACTUATED SAND DUMP SYSTEM AND METHODS

CROSS REFERENCE TO RELATED APPLICATIONS

This application claims the benefit of and priority to U.S. Provisional Patent Application No. 63/203,521, filed Jul. 26, 2021, which is hereby incorporated by reference in its entirety.

TECHNICAL FIELD

The present disclosure relates generally to sand dump systems, and more particularly to actuated sand dump systems with improved safety and automation features.

BACKGROUND

Sand dump systems are used in the flowback and early production stages of the oil and gas production process. Water and sand are injected into an oil or gas well as part of a fracking process, which stimulates the reservoir rock around the wellbore to promote high permeability pathways for reservoir fluids (e.g., oil, gas, or water) to flow more freely into the well. A mixture of crude oil, natural gas, water, and/or sand (collectively referred to as production fluids) flows back out of the well after fracking is completed. The volatile initial period when the production fluids first flow back to the surface is the flowback stage. As flow from the well normalizes and becomes consistent, the well transitions to the production stage.

The goal during the flowback and early production stages is to manage the sandy flowback fluid and keep the well open and running so it can normalize and the oil and gas can flow more freely. The fluid flows into and up the wellbore through production casing to the surface where it then flows from the wellhead and production tree at the surface to the treating and separation equipment. The separation equipment includes sand separators, which use a variety of technologies to separate sand from the fluid. The fluid is piped to on-site storage tanks or a processing facility. The sand is collected and/or removed.

During initial oil and gas well flowback, higher pressures are typically observed due to the initial communication with virgin rock. The higher pressure and volumes result in high flow velocities which are more likely to cause erosion and/or erosion-corrosion. Sand is usually present in the initial stages due to the higher velocities bringing sand from the fracture back into the wellbore and back to surface while the fractures and proppant are still settling.

A typical setup includes a set of valves in the line downstream of the sand separators to control "dumping" of the separated sand from the system. A choke is positioned downstream of the valves to control the flow rate of the sand. The valves have traditionally been manually operated. The valves must be opened and closed in a particular sequence and only when safe pressure levels are present in the system. Given the high pressures present in the system, there is a risk of injury to the operators of the valves in the event there is a pressure spike, the valves are opened in the wrong sequence, etc.

Opportunities exist for improvements in sand dump systems related to, among other things, safety and consistency in performance under a variety of conditions.

GENERAL DESCRIPTION

An actuated system includes a first valve positioned upstream of a choke, a second valve positioned downstream of the choke, and a control unit configured to open and/or close the first and second valves and the choke. In some embodiments, the control unit is configured to automatically open and close the valves and/or choke in a predetermined sequence in response to various other components or systems reaching one or more set points such as, for example, pressure set points, vessel weight, vessel volume, and/or time delay. In other embodiments, the valves and/or the choke can be manually commanded to open or close in a desired sequence.

The actuated system can be used with a variety of high or low pressure vessels or systems. In some embodiments, the actuation system is an actuated sand dump system configured to dump sand from a sand separator. For example, the valves and the choke can be positioned downstream of a sand separator and can be configured to dump sand from the sand separator when certain set points are reaches such as a pressure set point, the weight of the sand separator, the filled volume of the sand separator, or a time delay since the last time the sand was dumped.

The actuated system can be controlled at the location of the valves and choke or from a location that is remote from the valves and choke. In some embodiments, the actuated system can be controlled remotely over a network such as the Internet and can communicate with the actuated system through a wireless signal such as those available through mobile phone carriers, satellite communication providers, and the like.

The actuated system can also include a power unit that provides power to control the various components of the system. The power unit can be configured to be connected to a power grid or can be configured to provide power without a connection to the grid. For example, in some embodiments, the power unit can include a battery, solar panel, windmill, or the like, that is capable of generating and/or storing power without a connection to the power grid. This configuration is especially suitable for those situations where the components of the actuated system are controlled by electric actuators, motors, or the like.

The general description is provided to give a general introduction to the described subject matter as well as a synopsis of some of the technological improvements and/or advantages it provides. The general description and background are not intended to identify essential aspects of the described subject matter, nor should they be used to constrict or limit the scope of the claims. For example, the scope of the claims should not be limited based on whether the recited subject matter includes any or all aspects noted in the general description and/or addresses any of the issues noted in the background.

DRAWINGS

The preferred and other embodiments are described in association with the accompanying drawings in which:

FIG. 1 schematically shows an example actuated sand dump system in accordance with the present disclosure.

FIG. 2 schematically shows setup and design of an example actuated sand dump system in accordance with the present disclosure.

DETAILED DESCRIPTION OF EMBODIMENTS

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In various embodiments, with reference to the accompanying figures, the present disclosure generally is directed to an actuated sand dump system that includes electronically controlled valves, sensors, pressure gauges, a choke, and other features as described below. Once actuated, the system is configured to operate automatically to open or close the valves according to an operation sequence and when certain conditions are met (e.g., flow of sand is available, pressure conditions, operations of other components, etc.) without requiring an operator to be in close proximity to the system. In some embodiments, the system can be configured to be actuated automatically based on timers, weights, or volumes of sand—i.e., the system automatically dumps the sand on a set schedule, or when a threshold weight or volume of sand has been reached.

The system may also include sensors that detect useful life of the components, maintenance issues, and other safety and/or performance factors related to operation of the system. The electronic controller of the system may provide automatically generated notices and/or warnings in addition to operation of the components of the sand dump system. Some features of the system may be operated manually onsite where the valves are located, while other features are operable from a remote location. In some embodiments, each of the valves can be opened manually on site and/or opened manually remotely separate from the automatic sequencing.

Figure 1:
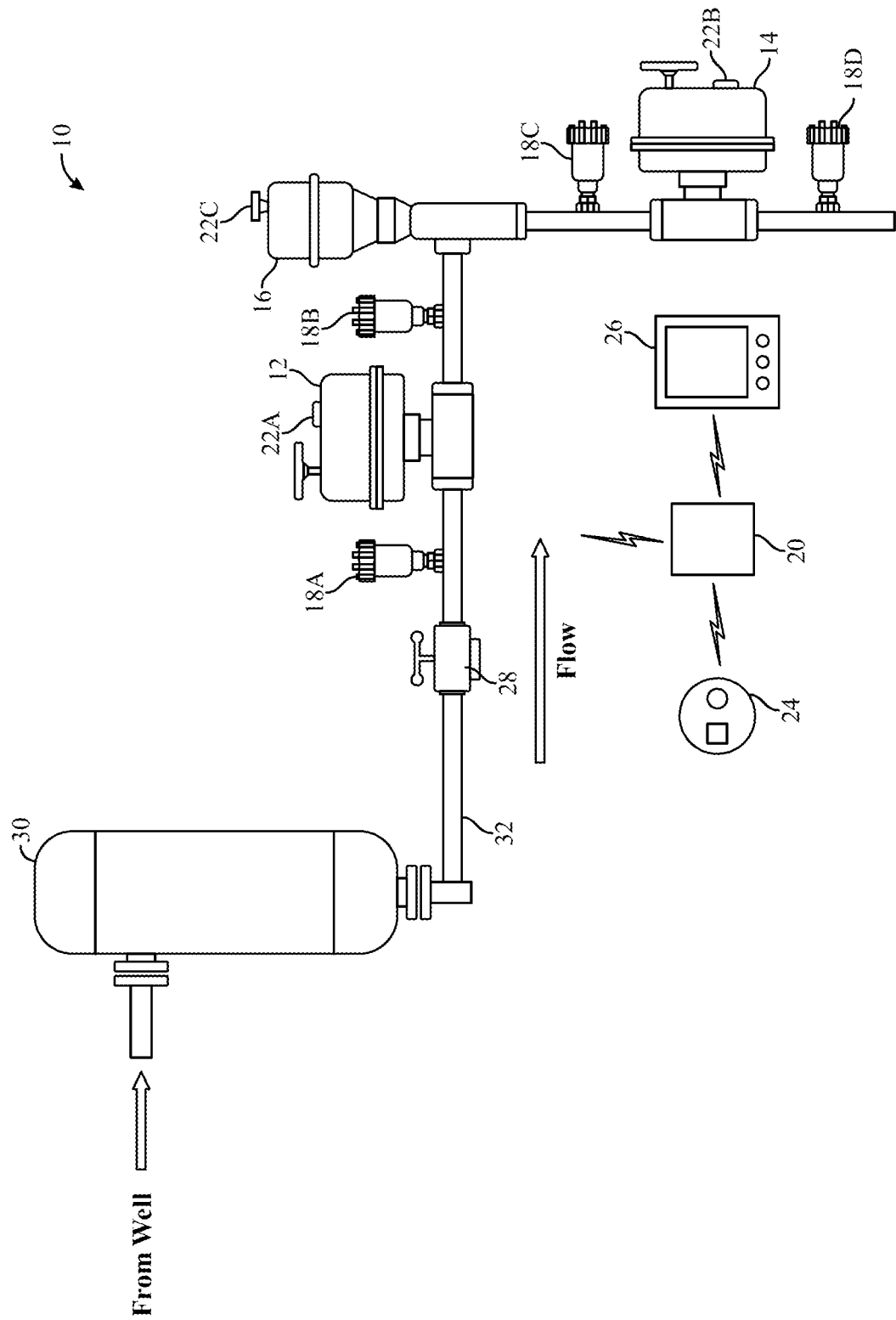

FIG. 1 shows an example actuated sand dump system 10 that implements features and functionality of the present disclosure. The actuated sand dump system 10 includes first and second valves 12, 14, a choke 16, a plurality of pressure gauges 18A-D, a control unit 20, and a plurality of sensors 22A-C, all of which are associated with a flow line 32 that receives a flow of sand, fluids, and other materials from a sand separator 30. The sand separator 30 receives a flow of petroleum, sand, and other fluids and materials from an oil or gas well. The flow from the well into the sand separator 30 can be the result of fracking or natural well production.

It should be appreciated that in some embodiments, the actuated sand dump system 10 includes the components shown in FIG. 1 between the sand separator 30 and a storage tank 36. For example, the sand separator 30 and the storage tank 36 may be part of a production oil or gas well. The actuated sand dump system 10 can be added when the sand separator 30 and the storage tank 36 are initially installed or later after they are already in production.

The actuated sand dump system 10 can be coupled to the sand separator 30, the storage tank 36, and/or other components or equipment, including other components or equipment in the actuated sand dump system 10 with various connection devices and methods. Examples of suitable connection devices and methods include hammer unions, flanges, threaded connections, or the like. The use of flange or hammer union connections provides the advantage of allowing the system to be rated to withstand higher pressures such as 10,000 psi or higher.

The actuated sand dump system 10 may further include a safety and/or alarm system 24, a user interface 26, and one or more manual valves 28. At least some of the features of the system 10 may be in wireless communication with each other. For example, the control unit 20 may be in wireless communication with one or more of the pressure gauges 18A-D, sensors 22A-C, safety/alarm system 24, user interface 26, and/or a network such as a local area network (LAN), wide area network (WAN), the internet, or the like. The control unit 20 may be in communication with other features and functionalities such as, for example, a data base, one or more servers, or the like, as will be described in further detail below.

As shown in FIG. 1, the manual valve 28 may be positioned in the line 32 between the sand separator 30 and the first valve 12. The manual valve 28 may provide a manual on/OFF control for safety or other purposes. The manual valve 28 may be, for example, a manual plug valve, or any other type of valve that meets the specifications and functional requirements particular to any given actuated sand dump system.

The first valve 12 is positioned in the line 32 between the manual valve 28 and the choke 16. The second valve 14 may be positioned in the line 32 between the choke 16 and outlet of the line 32 (e.g., a storage such as an open top tank 36 shown below with reference to FIG. 2). The pressure gauges 18A-D may be positioned on upstream and downstream sides of each of the first and second valves 12, 14 and the choke 16. The pressure gauges 18A-D provide pressure readings within the line 32.

In one example, the first and second valves 12, 14 are ball valves, such as electric actuated ball valves manufactured by Piper Oil Field Products of Oklahoma City, OK Any other types of electronic actuated valves may be used for the first and second valves, 12, 14. The choke 16 may be an actuated choke, such as the choke manufactured by Schlumberger and sold under the brand name Cameron and actuated by an electric actuator manufactured by Flowserve and sold under the brand name Limitorque.

Generally, the first and second valves 12, 14 are intended to provide ON/OFF control of flow through the line 32. The first and second valves 12, 14 typically are not intended to throttle the flow through line 32. Generally, the choke 16 is intended to provide flow control using throttling. The choke 16 is intended to have an internal wear piece that, when showing signs of wear, is replaceable rather than having to replace the entire choke device 16. In at least some examples, the first and second valves 12, 14 are intended to be opened completely before opening the choke 16 to provide flow through the line 32 and throttling of the flow. Likewise, when shutting OFF flow through the line 32, the choke 16 is typically closed first followed by closing the first and second valves 12, 14. Using the choke 16 to provide throttling of the flow, including changing from zero flow to full flow or from full flow to zero flow, results in the significant wear occurring in the replaceable components of the choke as compared to the wear that may otherwise occur on the first and second valves 12, 14. It should be noted, however, that in some embodiments, the valves 12, 14 can also include replaceable wear components.

The pressure gauges 18A-D may include one or more pressure sensors, transmitters, and other features and functionality. In one example, the pressure gauges 18A-D are Vega pressure transmitters manufactured by Vega Americas, Inc. of Cincinnati, Ohio. Many other types of pressure gauges, pressure sensors or the like may be used to determine the pressure in the line 32 upstream and downstream of the first and second valves 12, 14 and choke 16.

The sensors 22A-C may be associated with each of the first and second valves, 12, 14 and choke 16. The sensors 22A-C may monitor an open/closed state, ON/OFF status, or other features and functionality of the valves 12, 14 and choke 16. The system 10 may include additional sensors associated with other features of the system 10. The feedback from the sensors 22A-C may be provided to the control unit 20 for use in operating the system 10. In some embodiments, the control unit 20 can include input/output cards, programmable logic controller, human-machine interface, or the like. Additional details about the control unit 20 are described below.

The safety/alarm system 24 may provide notices to the operator or people in proximity to the system 10 related to the features, functionality, and/or operational states of the system 10. For example, the safety/alarm system 24 may generate a visual, audio, or tactile message associated with various functions or states of the system 10. In one example, the safety/alarm system 24 generates both an audible warning (e.g., alarm), as well as a visual warning (e.g., a flashing light) prior to initiating an opening sequence, prior to opening one or more of the valves 12, 14 or choke 16, initiating a closing sequence, closing any one of the first and second valves 12, 14 and choke 16, or indicating a high or low pressure that is outside of predetermined range for the system 10. In some of these examples, the safety/alarm system 24 automatically closes one or more of the valves 12, 14 and choke 16 upon determining a pressure in the line 32 that is outside of a predetermined range, malfunction of one of these system components, or the like. The safety/alarm system 24 may monitor the sequence of operations and generate an alarm or warning if certain steps are not accomplished (e.g., opening or closing of a valve, etc.) within a predetermined time period. The safety/alarm system 24 may monitor the cycles, hours of use, or other features associated with the useful life of one or more components of the system 10 and generate an alarm or warning when such components are nearing the end of a predetermined useful life.

The user interface 26 may include a panel with actuatable buttons, switches and the like, and/or a display screen. The display may include a display screen includes touch actuatable portions, or the like. The user interface 26 may provide an interface with one or more users at the physical location of the valves 12, 14 and choke 16 and other physical components of the system 10. Additionally, or alternatively, the user interface 26 is located at a remote location where a user may interface with the system 10 to provide controls, feedback, and the like. In some of these examples, the control unit 20 may be integrated into the user interface 26, or vice versa.

Figure 2:
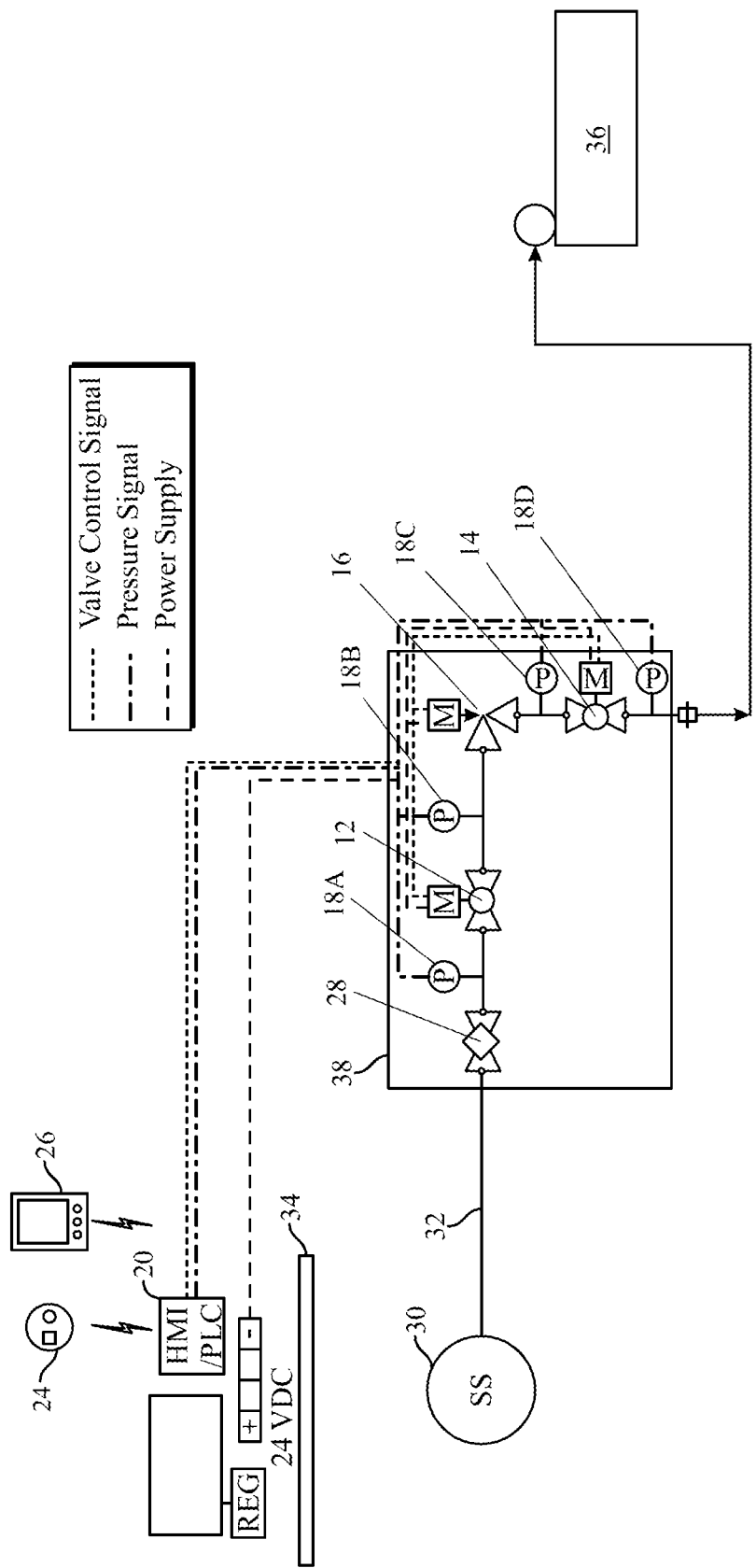

Referring now to FIG. 2, the actuated sand dump system 10 setup design is shown schematically. The system 10 shown in FIG. 2 additionally includes a power and/or communication skid 34 and storage 36. In some embodiments, the skid 34 can be used to make the actuated sand dump system 10 self-supporting with its own source of electric power and communications capability. In other embodiments, the actuated sand dump system 10 can be configured to connect pre-existing power and communications services.

The skid 34 may include, for example, a solar panel, battery pack, regulator, or the like. The skid 34 may provide power to one or more of the first and second valves 12, 14, choke 16, pressure gauges 18A-D, sensors 22A-C, control unit 20, safety/alarm system 24, user interface 26, and other components of system 10. The skid 34 can also include communications equipment such as a modem, hardwire, or wireless equipment. For example, the skid 34 may be configured to connect wirelessly to a mobile data network such a land based mobile phone network or a satellite based data network.

Valve control signals from the first and second valves 12, 14 and choke 16 may be directed to the control unit 20. Pressure signals from the pressure gauges 18A-D may also be directed to the control unit 20. In some of these examples, the control unit 20 may be mounted to the skid 34 and may be powered by a power source associated with the skid 34.

The valve control signals and pressure signals may be communicated wirelessly or via a wired connection with the control unit 20 and/or other features such as the safety/alarm system 24 and user interface 26.

The storage 36 may be an open top tank or other storage device to receive flow directed through line 32. The contents stored in storage 36 may be stored at atmospheric pressure or other pressure states that are less than the pressure of the flow received from the sand separator. Other types of storage containers may be used in other embodiments.

Figure 3:
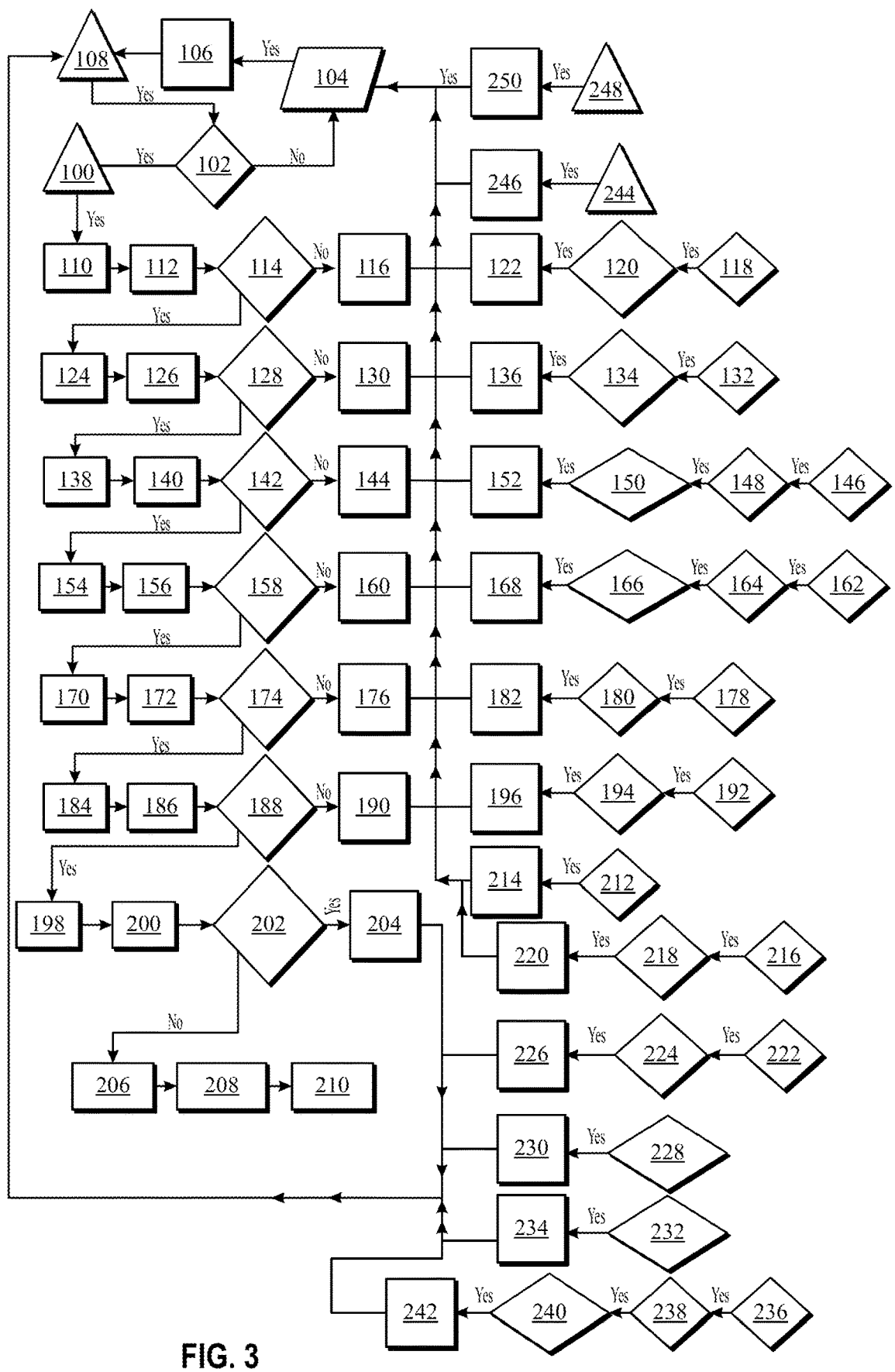
FIG. 3 is a flow diagram showing an example method of operating an actuated sand dump system in accordance with the present disclosure.

Referring now to FIGS. 3-7, an example flow chart is shown including example operation steps and related conditions for operation of an actuated sand dump system in accordance with the present disclosure. FIG. 3 shows the entirety of the flow diagram. FIGS. 4-7 show portions of the flow diagram of FIG. 3. In FIGS. 3-7, the triangle-shaped blocks represent operator control. The square blocks represent alarms or warnings (the setpoint for the alarms are fully adjustable). The diamond-shaped blocks represent a logical path. The elongate rectangle shaped blocks represent logic process. The rhombus shaped blocks represent a hard emergency shut down (ESD).

Figure 4:
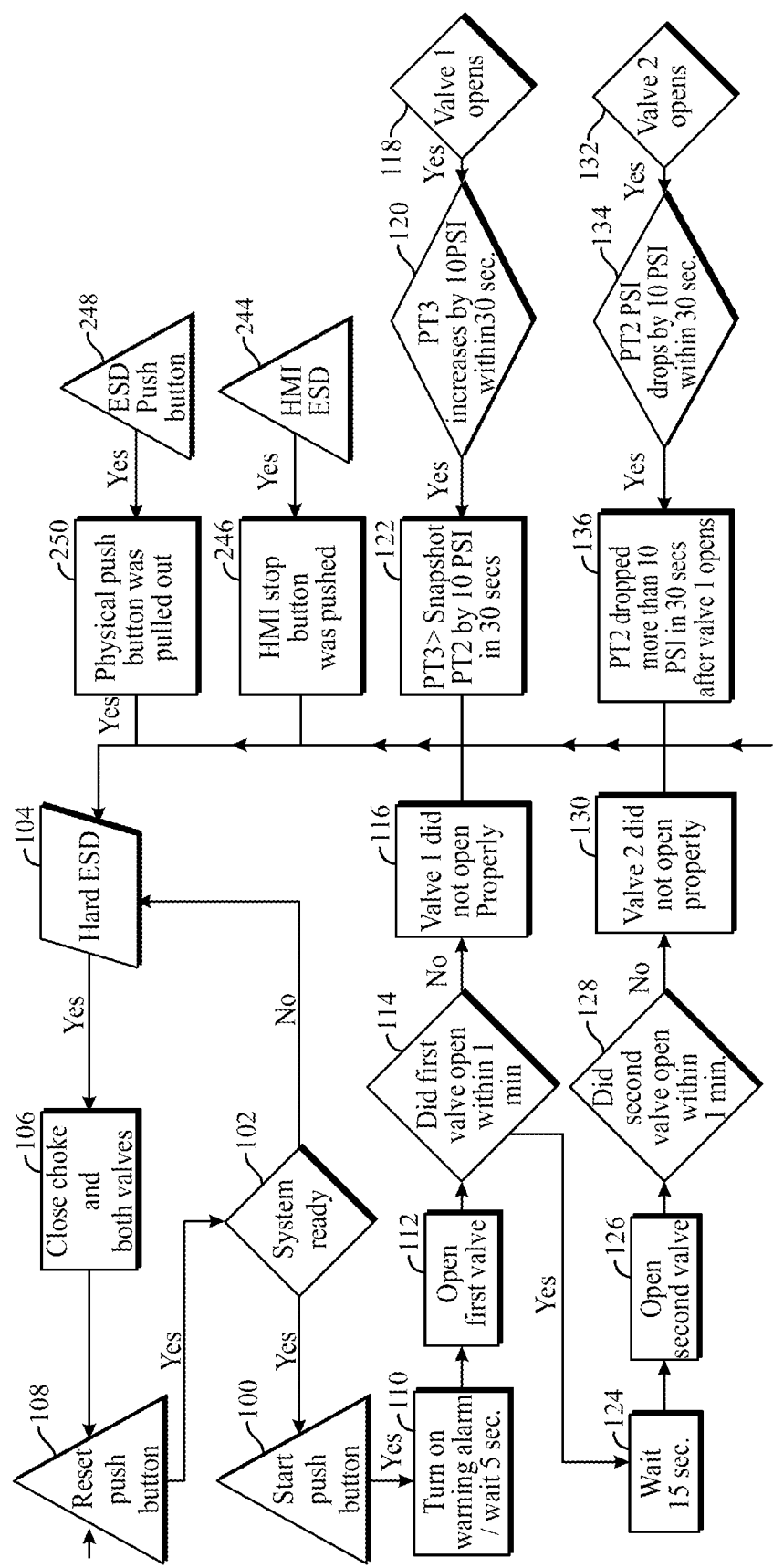
FIG. 4 shows a portion of the flow diagram of FIG. 3 with further detail.

FIG. 4. shows an initial phase of flow diagram of FIG. 3. At block 100, an operator initiates operation of the actuated sand dump system, for example, by pushing a start button or otherwise actuating operation of the sand dump system. After the initial step at block 100, the actuated sand dump system operates relatively automatically based on preprogrammed logic, sensor feedback and program specific details. The specific time periods, pressure values and other parameters shown in FIGS. 4-7 are exemplary only. Numerous other such values or combinations of values and parameters may be used in related methods of operation using more or fewer of the steps and functionality shown in FIGS. 4-7.

The system may be indicated as "system ready" at block 102 prior to the operator starting the operation of block 100. If the system is not ready at block 102, the system moves to a hard ESD at block 104. The hard ESD, or emergency shut down, may result in immediate closing the choke and first and second valves at block 106. A hard ESD may include shutting all of the choke and valves concurrently. A soft ESD, which may replace the hard ESD, may include closing the choke followed by closing the first and/or second valve. Closing the choke first followed by closing the valves may help limit wear on the valves and/or other components of the actuated sand dump system.

After a hard ESD and closing of the choke and valves at block 106, a reset button may be required to be pushed at block 108. The reset may include a physical actuation of a reset button or an electronic reset. Resetting at block 108 may result in an evaluation of the system being ready at block 102. If the system is ready at block 102, the operator may be given the option of initiating the start sequence at block 100.

Following starting at block 100, the system may turn ON a warning alarm at block 110. The warning alarm may include operation of the safety/alarm system 24 as described above. The warning alarm may include, for example, audible, visual and/or tactile alarms or warnings that provide an indication to people in the physical location and/or at a remote location that an opening sequence is to be initiated to permit flow through the actuated sand dump system. The warning alarm may be given for a predetermined time period such as, for example, five seconds. A first valve may then be opened at block 112. The system may determine at block 114 whether the first valve opened within a predetermined time period such as, for example, one minute. If the valve is not opened within that time period, at block 116 the system determines that the first valve did not open properly, and the system initiates a hard ESD at block 104. The system determines whether the first valve is opened using, for example, pressure readings from the pressure gauges 18A and 18B. At block 118, the valve is instructed to be opened. At block 120, the pressure reading at the pressure gauge 18B is detected to increase by a predetermined amount within a certain time period, such as 10 psi within about 30 seconds. At block 122, if the pressure does not increase within a certain time period, as determined at the pressure gauge 18B, it is determined at block 116 that the valve did not open properly.

If it is determined that the first valve is opened at block 114, a time period or delay period at block 124 may ensue. An example delay is about 15 seconds. Following the delay at block 126 the system instructs the second valve to open. At block 128, the system determines whether the system determines whether the second valve opens within a certain time period such as, for example, one minute. If the system does not detect the second valve opened properly at block 130, a hard ESD at block 104 occurs.

The system determines whether the second valve opens within a certain time period if, after the second valve is instructed to open at block 132, the system measures whether the pressure gauge 18D drops by a certain amount within a given time period, such as a 10 psi drop within 30 seconds. The pressure drop at the pressure gauge 18D may represent the drop in pressure resulting in the line downstream of the second valve 14 being open to the storage 36 (e.g., an open top tank).

It should be appreciated that the set points for each trigger in FIG. 4 can be fully adjusted in the logic to allow the operator to maintain equipment durability and safety.

Figure 5:
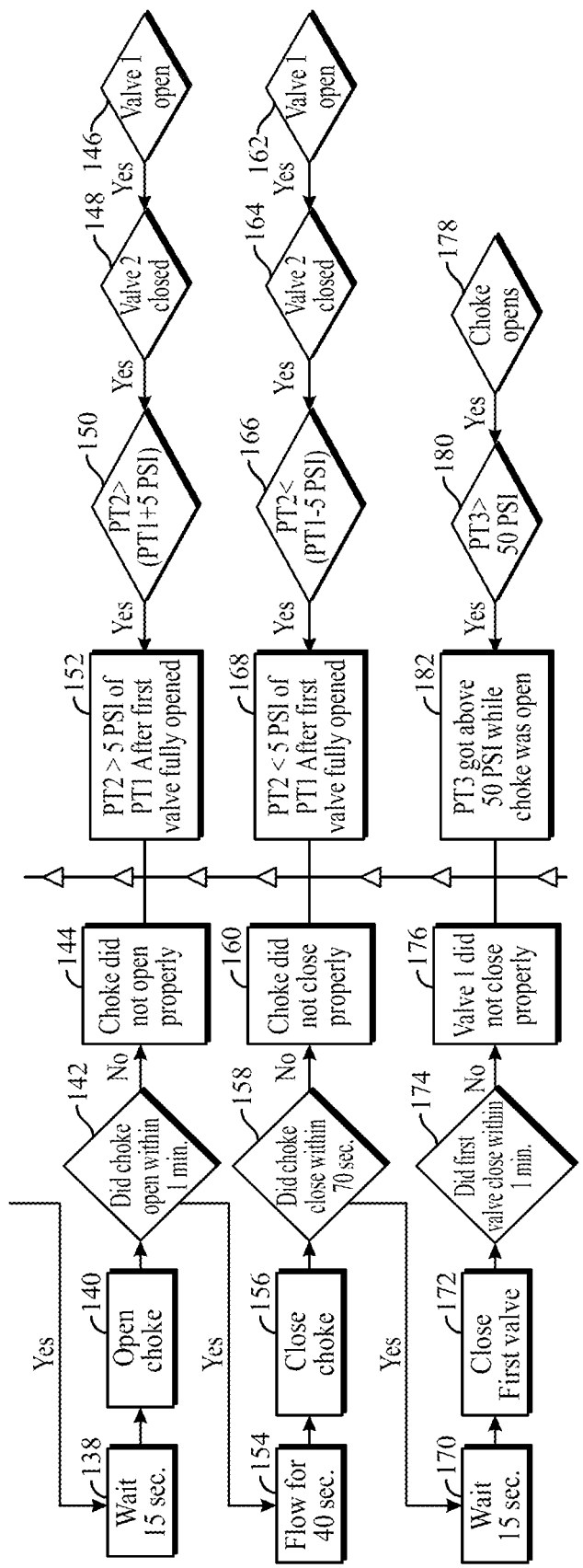
FIG. 5 shows another portion of the flow diagram of FIG. 3 with further detail.

Referring now to FIG. 5, another portion of the flow diagram of FIG. 3 is shown and described. When the system determines that the second valve is open at block 128, the system proceeds to a delay at block 138 for a predetermined time period such as, for example, 15 seconds. After the delay, at block 140 the system instructs the choke to open. At block 142, the system determines whether the choke has opened within the predetermined time period such as, for example, one minute. If the choke is not determined to be opened at block 144, the system moves to hard ESD at block 104. The system determines whether the choke has opened by first determining whether valve one is open at block 146 determining that valve 2 is closed at block 148, determining whether the pressure downstream of the second valve is greater than the pressure upstream of the first valve, and a predetermined pressure amount (e.g., about 5 psi) at block 150. If the pressure downstream of the second valve is not greater than such amount, it is an indication at block 152 that the choke is not open. It should be noted that the pressure gauges 18A-D correspond to PT1-4, respectively, in FIG. 5.

Once the system determines that the choke is opened at block 142, the system delays at block 154 a predetermined time, such as about 40 seconds, and then closes the choke at block 156. At block 158, the system determines whether the choke has closed within a predetermined time period such as about 70 seconds. If the choke is determined not to be closed at block 160, the system moves to a hard ESD at block 104. The system determines if the choke has closed by determining at block 162 that the first valve is open, determining that the second valve is closed at block 164, and detecting whether the pressure downstream of the second valve is less than the pressure upstream of the first valve minus a certain pressure value such as, for example, 5 psi at block 166. If the pressure downstream of the second valve is not less than that amount, at block 168 the system determines that the choke did not close, and the system moves to a hard ESD.

After determining that the choke has closed at block 158, the system has a delay at block 170 of a predetermined time, such as, for example, 15 seconds and then closes the first valve at block 172. At block 174, the system determines whether the first valve has closed within a predetermined time period such as, for example, about 1 minute. If the system does not determine that the first valve closed properly at block 176, the system moves to the hard ESD at block 104. The system determines if the first valve closed by determining whether the choke is open at block 178, and determining that the pressure in the line between the first valve and choke is greater than a predetermined amount such as, for example, about 50 psi at block 180. If the pressure between the first valve and choke is not greater than the predetermined amount, at block 182, the system determines that the first valve has not closed and moves to the hard ESD at block 104.

Figure 6:
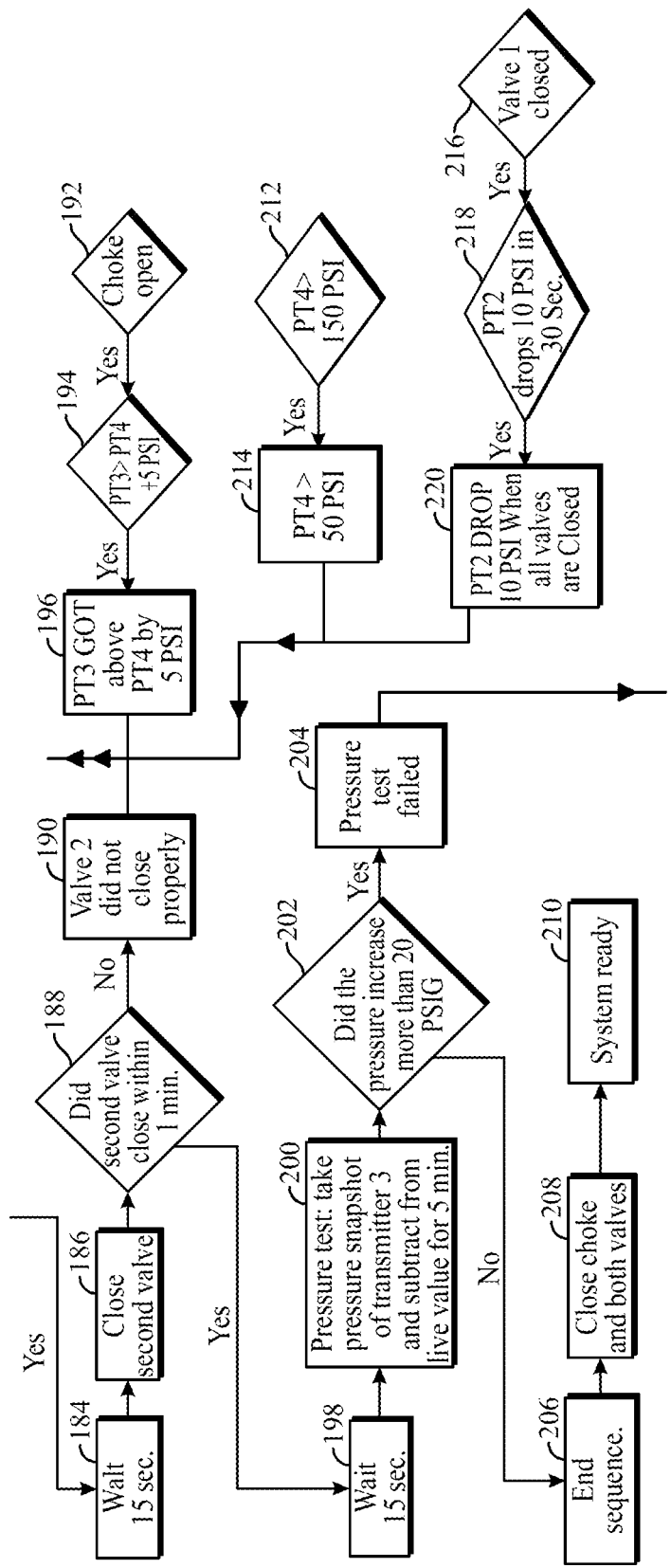
FIG. 6 shows another portion of the flow diagram of FIG. 3 with further detail.

Referring now to FIG. 6, the third segment of the flow diagram of FIG. 3 is shown and described. Once the first valve is determined to be closed at block 174, the system has a delay at block 184 in amount of, for example, about 15 seconds and then closes the second valve at block 186. The system determines at block 188 if the second valve has closed within a predetermined time period such as, for example, about 1 minute. If at block 190 the system determines that the second valve did not close properly, the system moves the hard ESD at block 104. The system determines if the second valve is closed by first determining if the choke is open at block 192, and determining whether the pressure in the line between the first valve and the choke is greater than a pressure between the choke and the second valve plus an additional amount (e.g., about 5 psi) at block 194. If the pressure in the line between the first valve and the choke is not above this amount, at block 196 the system determines that the second valve is not closed and moves to the hard ESD at block 104.

Once the system determines that the second valve has closed within a predetermined time at block 188, the system may have a delay at block 198 of, for example, about 15 seconds followed by a pressure test at block 200. The pressure test may include taking a pressure snapshot of the pressure gauge in the line between the first valve and choke and subtracting that from a line value for predetermined time, such as, for example, about five minutes. If the pressure increased by more than a predetermined amount during the pressure test (e.g., about 20 psi) at block 202, the pressure test failed at block 204 and the system returns to the rest at block 108. If the pressure did not increase more than the predetermined amount at block 202, the system ends the sequence at block 206, the choke and both valves are closed at block 208, and the system is ready for a new opening sequence at block 210, which may coincide with the system ready block 202.

The system may also check whether the pressure in the line between the choke and the second valve is greater than a predetermined amount (e.g., about 150 psi) at block 212. If the pressure amount is greater than that level, at block 214, the system proceeds to the hard ESD at block 104. Further, the system may check at block 216 whether the first valve is closed and determine whether the pressure in the line between the first valve and choke drops a predetermined amount within a given time period, such as about 10 psi within 30 seconds at block 218. If these conditions are met as determined at block 220, the system may also move to the hard ESD at block 104.

Figure 7:
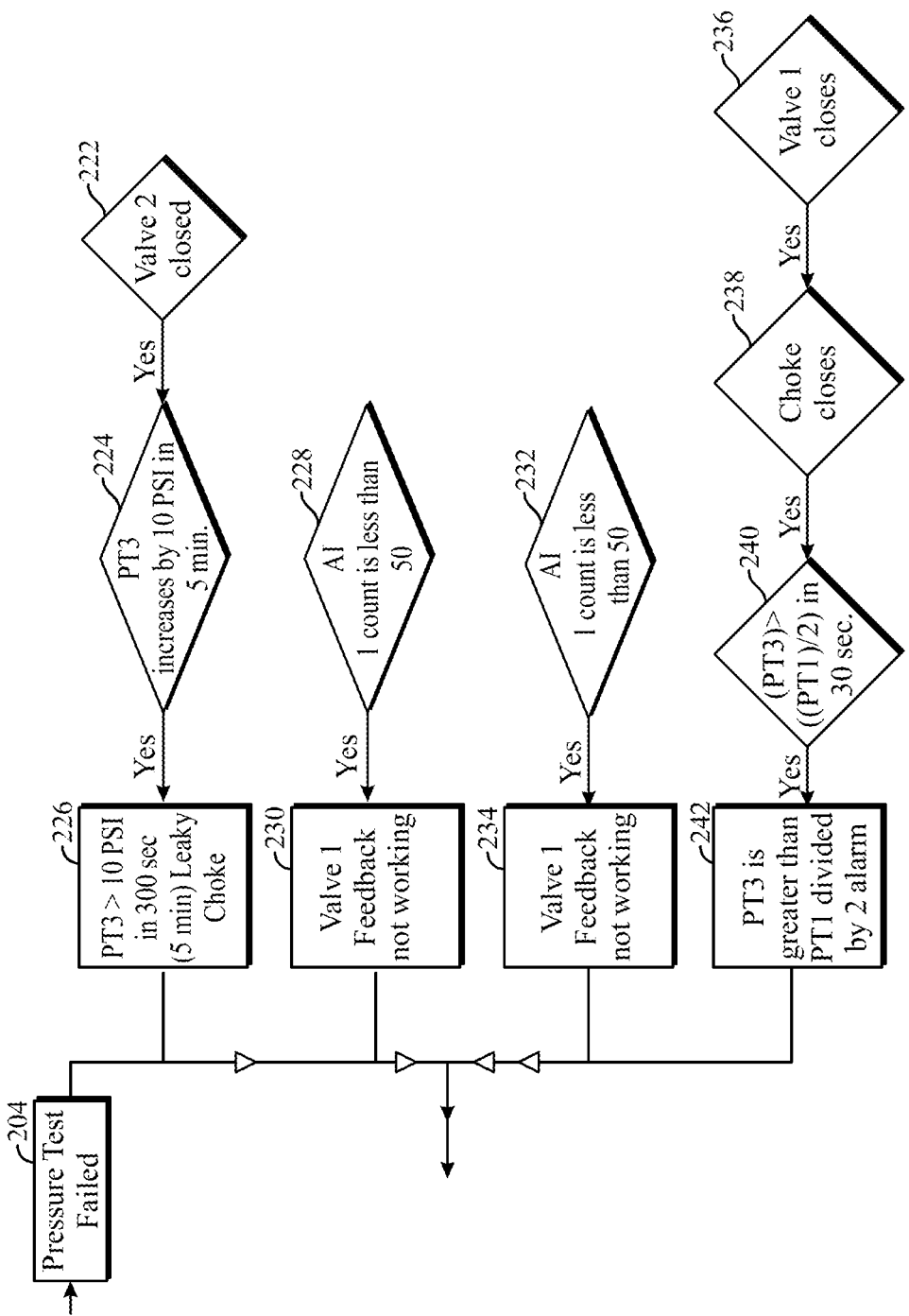
FIG. 7 shows another portion of the flow diagram of FIG. 3 with further detail.

FIG. 7 shows another segment of the flow diagram of FIG. 3, which may relate to additional system functions that result in a need for reset of the system rather than moving to a hard ESD. At block 222, the system may determine whether the second valve is closed and, if so, at block 224 determine whether the pressure in the line between the first valve and choke increases by a certain amount within a given time period such as, for example, about 10 psi within 5 minutes. If these conditions are met as determined at block 226, the system determines that there is a leaky choke and the system must be reset.

In another system determination, at block 228 the system determines whether 1 count is less than a certain amount, such as, for example, about 50. If the system determines at block 230 that this condition is met, the system determines that the first valve feedback is not working properly and moves to reset at block 108. The blocks 228, 230 can be used to determine whether the valve has actually opened/closed by capturing a pressure reading before and after the valve opens/closes. This is a secondary check to make sure there are no restriction or hazard issues (e.g., valve leaking or stuck open) in the operation when opening or closing valves.

In a further system check, at block 236, the system determines whether the first valve is closed, at block 238 determines whether the choke is closed, and at block 240 determines if the pressure in a line between the first valve and choke is greater than the pressure upstream of the first valve divided by 2 as determined within a certain time period such as, for example, about 30 seconds. At block 242, if this condition is met, the system moves to the reset at block 108.

The system may also move to a hard ESD at block 104 after other system checks. For example, at block 248 the system detects whether an emergency shutdown (ESD) button has been pushed manually by an operator. If this condition is met at block 250, the system moves to the hard ESD at block 104. At block 244, the system determines whether an emergency shutdown (ESD) has been initiated by an human machine interface (HMI), and if that condition is met at block 246, the system moves to the hard ESD at block 104. Generally, the ESD may be initiated either automatically according to determinations by the system whether certain conditions are met (e.g., pressure levels within certain time periods, and the like), or whether the ESD is initiated by an operator of the system (e.g., using either a physical or electronic actuation of the ESD).

Figure 8:
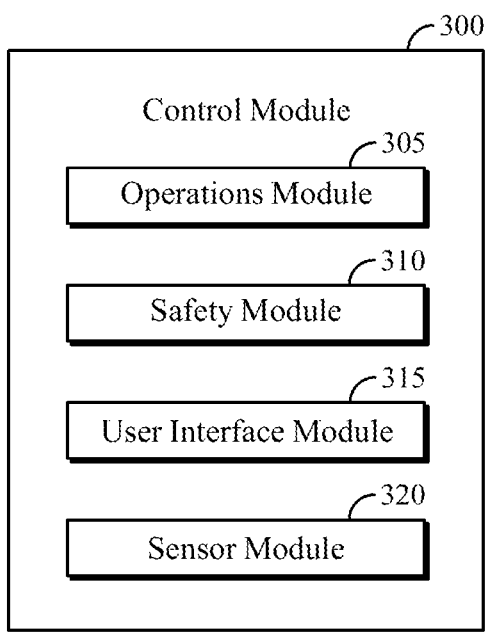
FIG. 8 is a block diagram of an example control module of an actuated sand dump system in accordance with the present disclosure.

FIG. 8 shows an example control module 300 that is maybe operable as part of the actuated sand dump systems disclosed herein. The control module 300 may be one example of, for example, the control unit 20 or aspects of the control unit 20, the safety/alarm system 24, the user interface 26, and the like. In one example, the control module 300 includes an operations module 305. The operations module 305 may provide instructions to open and/or close one of the valves or choke of the actuated sand dump system. The operations module may actively operate one or more components of the system. A safety module 310 may provide communications with and/or control of the safety/alarm system. The safety module 310 may operate based on, for example, settings and/or parameters input by an operator. For example, the safety module 310 may operate to turn ON or OFF warning devices such as lights, speakers, vibration devices, or the like, and provide timers by which the warning messages operate.

The user interface module 315 may receive instructions or input from and/or display information or communicate information to a user via, for example, the user interface 26. The user interface module may operate to control a display such as touch input display. The user interface module 315 may receive instructions from or provide controls associated with operation of the system via the user interface. The sensor module 320 may operate to send or receive signals from one or more sensors of the system. The sensor module may include ON/OFF control of sensors, set parameters for sensor operation, or the like.

Figure 9:
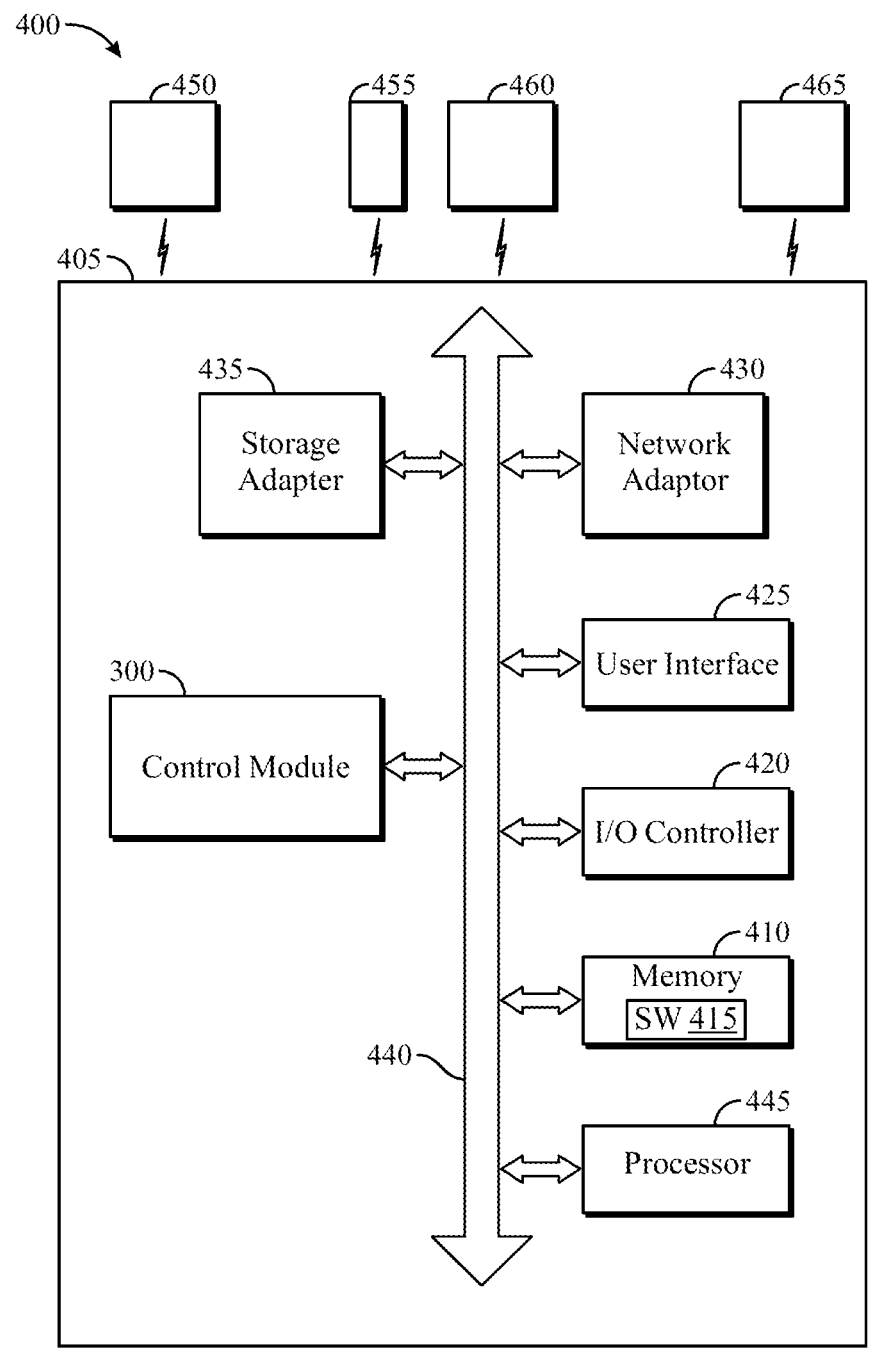
FIG. 9 is a block diagram of a system that is one example of an actuated sand dump system in accordance with the present disclosure.

FIG. 9 shows a diagram of a system 400 including a device 405 that supports dynamic accessibility compliance of a website in accordance with aspects of the present disclosure. The device 405 may be an example of or include the components of system 100, or other devices as described herein. The device 405 may include components for transmitting and receiving communications, including a control module 300, an I/O controller 415, a transceiver 420, an antenna 425, memory 430, and a processor 440. These components may be in electronic communication via one or more buses (e.g., bus 445).

The control module 300 may provide at least some of the functionality related to the systems and methods described above with reference to FIGS. 1-8. The control module 300 may monitor and/or control various features and functionality of any of the components and subsystems of the actuated sand dump system.

The I/O controller 415 may manage input and output signals for the device 405. The I/O controller 415 may also manage peripherals not integrated into the device 405. In some cases, the I/O controller 415 may represent a physical connection or port to an external peripheral. In some cases, the I/O controller 415 may utilize an operating system such as iOS®, ANDROID®, MS-dOS®, MS-WINDOWS®, OS/2®, UNIX®, LINUX®, or another known operating system. In other cases, the I/O controller 415 may represent or interact with a modem, a keyboard, a mouse, a touchscreen, or a similar device. In some cases, the I/O controller 415 may be implemented as part of a processor. In some cases, a user may interact with the device 405 via the I/O controller 415 or via hardware components controlled by the I/O controller 415.

The transceiver 420 may communicate bi-directionally, via one or more antennas, wired, or wireless links as described herein. For example, the transceiver 420 may represent a wireless transceiver and may communicate bi-directionally with another wireless transceiver. The transceiver 420 may also include a modem to modulate the packets and provide the modulated packets to the antennas for transmission, and to demodulate packets received from the antennas.

In some cases, the wireless device may include a single antenna 425. However, in some cases the device may have more than one antenna 425, which may be capable of concurrently transmitting or receiving multiple wireless transmissions. The antenna 425 may provide wireless communication with various components of an actuated sand dump system, such as one or more valves 450, choke 455, pressure gauges 460, and sensors 465, which may be examples of the valves 12, 14, choke 16, pressure gauges 18A-D, and sensors 22A-C discussed above with reference to FIGS. 1 and 2.

The memory 430 may include RAM and ROM. The memory 430 may store computer-readable, computer-executable code 435 including instructions that, when executed, cause the processor to perform various functions described herein. In some cases, the memory 430 may contain, among other things, a BIOS which may control basic hardware or software operation such as the interaction with peripheral components or devices.

The processor 440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 440 may be configured to operate a memory array using a memory controller. In other cases, a memory controller may be integrated into the processor 440. The processor 440 may be configured to execute computer-readable instructions stored in a memory (e.g., the memory 430) to cause the device 405 to perform various functions (e.g., functions or tasks supporting dynamic accessibility compliance of a website).

The code 435 may include instructions to implement aspects of the present disclosure, including instructions to support dynamic accessibility compliance of a website. The code 435 may be stored in a non-transitory computer-readable medium such as system memory or other type of memory. In some cases, the code 435 may not be directly executable by the processor 440 but may cause a computer (e.g., when compiled and executed) to perform functions described herein.

Figure 10:
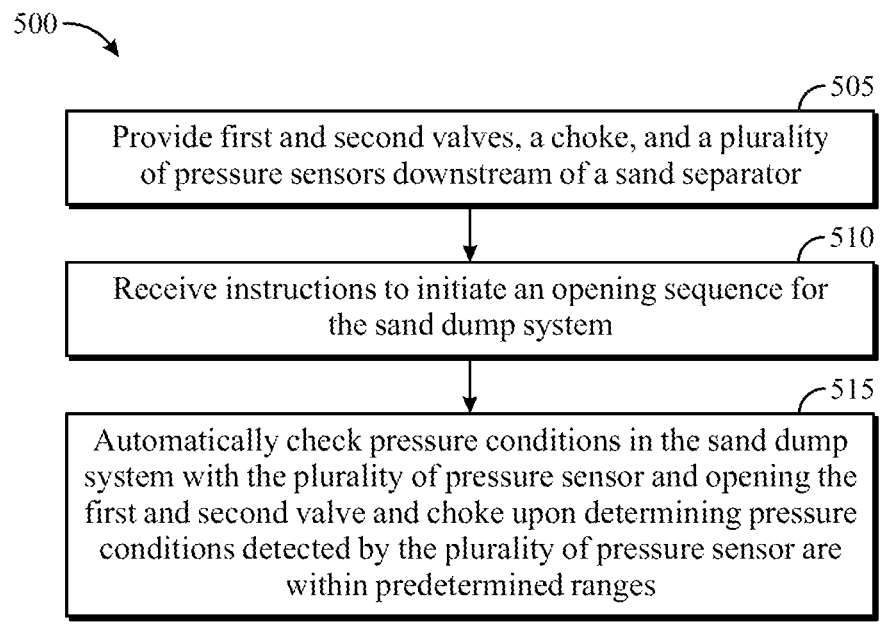
FIG. 10 is a flow diagram showing steps of an example method in accordance with the present disclosure.

Referring to FIG. 10, an example method 500 related to operating an actuated sand dump system is described. The method 500 may be one example of the features or functionality of any one of the systems disclosed herein with reference to FIGS. 1-9.

The method 500 includes, at block 505, providing first and second valves, a choke, and a plurality of pressure sensors. These components may be positioned downstream of a sand separator. At block 510, the method includes receiving instructions to initiate an opening sequence for the sand dump system. The opening sequence may result in opening the valves and choke to permit flow from the sand separator to a storage device, such as an open top tank. At block 515, the method 500 includes automatically checking pressure conditions in a sand dump system with the plurality of pressure sensors and opening the first valve, choke, and second valve upon determining pressure conditions detected by the plurality of sensors are within predetermined ranges. The sequence of opening and closing the first and second valves and choke relative to each other may vary in different embodiments. The predetermined ranges may include upper pressure ranges and lower pressure ranges.

The method 500 may also include receiving instructions to initiate a closing sequence for the sand dump system, confirming the first and second valves and choke are open, automatically checking pressure conditions in the sand dump system with the plurality of pressure sensors, and closing the first and second valves and choke upon determining pressure conditions detected by the plurality of pressure sensors are within predetermined ranges. A sequence of closing components may include closing the choke followed by closing the first and second valves. A sequence for opening components may include opening the first and second valves followed by opening the choke.

The method 500 may also include detecting with one or more sensors an open state of the first and second valves and choke, automatically opening the choke upon detecting the first valve is open, and automatically opening the second valve upon detecting the choke is open. The method 500 may include detecting with one or more sensors an open state of the first and second valves and choke, automatically closing the choke upon detecting the second valve is closed, and automatically closing the first valve upon detecting the choke is closed. The method 500 may include further providing a control unit, the control unit receiving the instructions to initiate the opening sequence, receiving sensor signals from the plurality of pressure sensors, determining pressure conditions detected by the plurality of pressure sensors are within predetermined ranges, and automatically opening the first and second valves and choke.

The automated sand dump system and related methods of operation disclosed herein may provide a number of advantages over existing sand dump systems. For example, the sand sump systems disclosed herein may provide, among other things, the following advantages: (i) improved consistency in opening and closing of the valves and choke based on specific pressure conditions and timing of the system operation, (ii) improved safety by providing automated emergency shutdown based on fixed system conditions such as pressure and timing, (iii) ability to control the actuated sand dump system either on site or from a remote location, (iv) optimization of component operation to enhance useful life of components, (v) ability for the system to be fully integrated into existing human machine interface systems and power sources or be fully self-supported with its own communications or power skid (gives the system the versatility to be permanent or temporarily utilized in a given application), (vi) remove operators from the line of fire increasing operator safety, (vii) use of electric valves reduces any spill potential and/or controlled gas release that might be encountered in hydraulic or pneumatic setups (system could be designed operate using these valve power options as well if desired). (viii) system can be run off a wide range of power supplies.

Many other methods related to manufacturing, assembly, operating and adjusting an actuated sand dump system may be carried out using the various embodiments and functionality disclosed herein. The method of FIG. 10 is exemplary only and may include more or fewer steps in other embodiments.

General Terminology and Interpretative Conventions

Any methods described in the claims or specification should not be interpreted to require the steps to be performed in a specific order unless expressly stated otherwise. Also, the methods should be interpreted to provide support to perform the recited steps in any order unless expressly stated otherwise.

Certain features described in the context of separate embodiments can also be implemented in combination in a single embodiment. Conversely, various features that are described in the context of a single embodiment can also be implemented in multiple embodiments separately or in any suitable subcombination. Moreover, although features may be described above in certain combinations and even initially claimed as such, one or more features from a claimed combination can be excised from the combination, and the claimed combination may be directed to a subcombination or variation of a subcombination.

The example configurations described in this document do not represent all the examples that may be implemented or that are within the scope of the claims. The term "example" shall be interpreted to mean "serving as an example, instance, or illustration," and not "preferred" or "advantageous over other examples."

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The phrase "based on" shall be interpreted to refer to an open set of conditions unless unequivocally stated otherwise (e.g., based on only a given condition). For example, a step described as being based on a given condition may be based on the recited condition and one or more unrecited conditions.

The terms have, having, contain, containing, include, including, and characterized by should be interpreted to be synonymous with the terms comprise and comprising—i.e., the terms are inclusive or open-ended and do not exclude additional unrecited subject matter. The use of these terms should also be understood as disclosing and providing support for narrower alternative embodiments where these terms are replaced by "consisting of" or "consisting essentially of."

Unless otherwise indicated, all numbers or expressions, such as those expressing dimensions, physical characteristics, or the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any subranges or any individual values subsumed by each range. For example, a stated range of 1 to 10 should be considered to include and provide support for claims that recite any subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth), which values can be expressed alone or as a minimum value (e.g., at least 5.8) or a maximum value (e.g., no more than 9.9994).

All disclosed numerical values are to be understood as being variable from 0-100% in either direction and thus provide support for claims that recite such values (either alone or as a minimum or a maximum—e.g., at least <value> or no more than <value>) or any ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range expressed individually (e.g., 15.2), as a minimum value (e.g., at least 4.3), or as a maximum value (e.g., no more than 12.4).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

None of the limitations in the claims should be interpreted as invoking 35 U.S.C. 112(f) unless the words "means for" or "step for" are explicitly recited in the claim.

Unless explicitly stated otherwise or otherwise apparent from context, it is terms such as "processing," "computing," "calculating," "determining," "displaying," or the like, refer to the action and processes of an electronic controller including a processor and memory.

The subject matter recited in the claims is not coextensive with and should not be interpreted to be coextensive with any embodiment, feature, or combination of features described or illustrated in this document. This is true even if only a single embodiment of the feature or combination of features is illustrated and described.

Joining or Fastening Terminology and Interpretative Conventions

The term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

The term "coupled" includes joining that is permanent in nature or releasable and/or removable in nature. Permanent joining refers to joining the components together in a manner that is not capable of being reversed or returned to the original condition. Releasable joining refers to joining the components together in a manner that is capable of being reversed or returned to the original condition.

Releasable joining can be further categorized based on the difficulty of releasing the components and/or whether the components are released as part of their ordinary operation and/or use. Readily or easily releasable joining refers to joining that can be readily, easily, and/or promptly released with little or no difficulty or effort. Difficult or hard to release joining refers to joining that is difficult, hard, or arduous to release and/or requires substantial effort to release. The joining can be released or intended to be released as part of the ordinary operation and/or use of the components or only in extraordinary situations and/or circumstances. In the latter case, the joining can be intended to remain joined for a long, indefinite period until the extraordinary circumstances arise.

It should be appreciated that the components can be joined together using any type of fastening method and/or fastener. The fastening method refers to the way the components are joined. A fastener is generally a separate component used in a mechanical fastening method to mechanically join the components together. A list of examples of fastening methods and/or fasteners are given below. The list is divided according to whether the fastening method and/or fastener is generally permanent, readily released, or difficult to release.

Examples of permanent fastening methods include welding, soldering, brazing, crimping, riveting, stapling, stitching, some types of nailing, some types of adhering, and some types of cementing. Examples of permanent fasteners include some types of nails, some types of dowel pins, most types of rivets, most types of staples, stitches, most types of structural ties, and toggle bolts.

Examples of readily releasable fastening methods include clamping, pinning, clipping, latching, clasping, buttoning, zipping, buckling, and tying. Examples of readily releasable fasteners include snap fasteners, retainer rings, circlips, split pin, linchpins, R-pins, clevis fasteners, cotter pins, latches, hook and loop fasteners (VELCRO), hook and eye fasteners, push pins, clips, clasps, clamps, zip ties, zippers, buttons, buckles, split pin fasteners, and/or conformat fasteners.

Examples of difficult to release fastening methods include bolting, screwing, most types of threaded fastening, and some types of nailing. Examples of difficult to release fasteners include bolts, screws, most types of threaded fasteners, some types of nails, some types of dowel pins, a few types of rivets, a few types of structural ties.

It should be appreciated that the fastening methods and fasteners are categorized above based on their most common configurations and/or applications. The fastening methods and fasteners can fall into other categories or multiple categories depending on their specific configurations and/or applications. For example, rope, string, wire, cable, chain, or the like can be permanent, readily releasable, or difficult to release depending on the application.

Drawing Related Terminology and Interpretative Conventions

Reference numbers in the drawings and corresponding description refer to identical or similar elements although such numbers may be referenced in the context of different embodiments.

The drawings are intended to illustrate embodiments that are both drawn to scale and/or not drawn to scale. This means the drawings can be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any ranges or subranges that can be formed by such values.

Spatial or directional terms, such as "left," "right," "front," "back," or the like, relate to the subject matter as it is shown in the drawings and/or how it is commonly oriented during manufacture, use, or the like. However, it is to be understood that the described subject matter may assume various alternative orientations and, accordingly, such terms are not to be considered as limiting.

The invention claimed is:

1. An actuated sand dump system comprising:
   a choke;
   a first valve positioned upstream of the choke;
   a second valve positioned downstream of the choke;
   a plurality of pressure gauges; and
   a control unit configured to:
      automatically open the first and second valves and the choke in a predetermined sequence, upon initiating the predetermined sequence, and in response to pressure measurements from the plurality of pressure gauges; and
      automatically close at least one of the first and second valves upon detecting, via the pressure measurements, a pressure condition above or below a predetermined level.

2. The system of claim 1, wherein a separate one of the plurality of pressure gauges is positioned upstream and downstream of each of the first valve, choke, and second valve.

3. The system of claim 1, wherein the control unit operates one or more safety devices to generate a warning signal in advance of opening the first valve.

4. The system of claim 1, further comprising at least one sensor associated with each of the first and second valves and the choke to determine an open/closed state thereof.

5. The system of claim 4, wherein the control unit confirms the choke is open based on the pressure measurements and sensor signals from the at least one sensor associated with the choke prior to opening the second valve.

6. The system of claim 5, wherein the control unit confirms the first valve is open based on the pressure measurements and sensor signals from the at least one sensor associated with the first valve prior to opening the choke.

7. The system of claim 1, wherein the control unit is operable from a location remote from the actuated sand dump system to initiate the predetermined sequence.

8. The system of claim 1, further comprising a user interface located in proximity to the actuated sand dump system and configured to receive manual user input to initiate the predetermined sequence.

9. The system of claim 1, further comprising a power unit electrically linked to the control unit to provide power to the control unit.

10. The system of claim 1, wherein the control unit is operable from a location remote from the actuated sand dump system to manually operate the first valve and/or second valve.

11. The system of claim 1, wherein the actuated sand dump system is located downstream from a sand separator.

12. A control system to operate a sand dump system, the sand dump system being configured to receive an output from a high or low pressure vessel and including first and second valves, a choke, and a plurality of pressure sensors, the control system operable to:
   receive instructions to initiate an opening sequence;
   automatically open the first valve, choke, and second valve based on the opening sequence, the first valve, choke and second valve being opened upon determining pressure conditions detected by the plurality of pressure sensors are within predetermined ranges; and
   automatically close at least one of the first and second valves and the choke when a pressure condition is detected that is above or below a predetermined level.

13. The control system of claim 12, wherein the first valve is opened upon determining a pressure condition upstream of the first valve is within a predetermined level.

14. The control system of claim 13, wherein the choke is opened upon confirming the first valve is opened and a pressure condition upstream of the choke is within a predetermined level.

15. The control system of claim 14, wherein the second valve is opened upon confirming the choke is opened and a pressure condition upstream of the second valve is within a predetermined level.

16. The control system of claim 12, wherein the control system is further operable to:
   generate an alarm prior to opening the first valve.

17. A method of controlling a sand dump system, the method comprising:
   providing first and second valves, a choke, and a plurality of pressure sensors downstream of a sand separator;
   receiving instructions to initiate an opening sequence for the sand dump system;
   automatically checking pressure conditions in the sand dump system with the plurality of pressure sensors and opening the first and second valves and choke upon determining pressure conditions detected by the plurality of pressure sensors are within predetermined ranges; and
   closing at least one of the first and second valves and the choke when a pressure condition is detected that is above or below a predetermined level.

18. The method of claim 17, further comprising:
   receiving instructions to initiate a closing sequence for the sand dump system;
   confirming the first and second valves and choke are open;
   automatically checking pressure conditions in the sand dump system with the plurality of pressure sensors and closing the first and second valves and choke upon determining pressure conditions detected by the plurality of pressure sensors are within predetermined ranges.

19. The method of claim 17, further comprising detecting with one or more sensors an open state of the first and second valves and choke, and automatically opening the choke upon detecting the first valve is open, and automatically opening the second valve upon detecting the choke is open.

20. The method of claim 17, further comprising detecting with one or more sensors an open state of the first and second valves and choke, and automatically closing the choke upon detecting the second valve is closed, and automatically closing the first valve upon detecting the choke is closed.

21. The method of claim 17, wherein the sand dump system further comprises a control unit, the control unit:
   receiving the instructions to initiate the opening sequence;
   receiving sensor signals from the plurality of pressure sensors;
   determining pressure conditions detected by the plurality of pressure sensors are within predetermined ranges;
   automatically opening the first and second valves and choke.

22. The system of claim 21, wherein instructions to initiate the opening sequence are provided in response to reaching predetermined setpoints for vessel weight, vessel volume, and/or a time delay.

* * * * *